(12) United States Patent
Selby et al.

(10) Patent No.: US 7,439,952 B2
(45) Date of Patent: Oct. 21, 2008

(54) POINTING DEVICE

(75) Inventors: Nathan James John Selby, Welbourn (GB); David William Clark, Southwell (GB); Robert Michael Turner, Newark (GB)

(73) Assignee: Cursor Controls Limited, Newark, Nottinghamshire (GB)

( * ) Notice: Subject to any disclaimer, the term of this patent is extended or adjusted under 35 U.S.C. 154(b) by 267 days.

(21) Appl. No.: 10/511,194

(22) PCT Filed: Mar. 3, 2003

(86) PCT No.: PCT/GB03/00869

§ 371 (c)(1),
(2), (4) Date: Mar. 31, 2005

(87) PCT Pub. No.: WO03/088025

PCT Pub. Date: Oct. 23, 2003

(65) Prior Publication Data

US 2005/0162390 A1    Jul. 28, 2005

(30) Foreign Application Priority Data

Apr. 12, 2002  (GB) .................................. 0208471.3
Sep. 18, 2002  (GB) .................................. 0221615.8

(51) Int. Cl.
*G09G 5/00*   (2006.01)
*G06F 3/033*  (2006.01)

(52) U.S. Cl. .................. 345/157; 345/166; 345/167
(58) Field of Classification Search ......... 345/163–167, 345/175, 156, 157; 250/221
See application file for complete search history.

(56) References Cited

U.S. PATENT DOCUMENTS

| 4,404,865 A |   | 9/1983 | Kim |
| 5,288,993 A |   | 2/1994 | Bidiville et al. |
| 5,486,845 A | * | 1/1996 | Chait .......................... 345/163 |

(Continued)

FOREIGN PATENT DOCUMENTS

DE          3407131 A1     2/1984

(Continued)

OTHER PUBLICATIONS

Agilent Technologies, Inc. HDNS-2100 (2001).

*Primary Examiner*—Alexander Eisen
*Assistant Examiner*—Kenneth B Lee, Jr.
(74) *Attorney, Agent, or Firm*—Stetina Brunda Garred & Brucker

(57) ABSTRACT

An electronic pointing cursor control device such as a trackball or mouse, comprising a first chamber adjoined to a second chamber, the chambers being separated by a fluid-tight wall comprising an optically permeable region; wherein the first chamber contains electronic components including optical detectors directed towards the optically permeable region and a ball protruding through an aperture provided in the second chamber, the detectors being operable in use to detect and generate electronic signals representative of motion of the ball. Also provided is an electronic pointing or cursor control device comprising a ball and optical detectors operable to detect and generate electronic signals representative of motion of the ball, wherein the detectors are mounted such that a radial line from the ball to the detectors forms a non-zero angle with a diametric line though the ball normal to the mounting plane of the device.

17 Claims, 8 Drawing Sheets

U.S. PATENT DOCUMENTS

| | | | |
|---|---|---|---|
| 5,541,621 A * | 7/1996 | Nmngani | 345/167 |
| 5,635,956 A | 6/1997 | Tak | |
| 5,751,275 A * | 5/1998 | Bullister | 345/167 |
| 6,084,574 A | 7/2000 | Bidiville | |
| 6,172,665 B1 | 1/2001 | Bullister | |
| 6,218,659 B1 * | 4/2001 | Bidiville et al. | 250/221 |
| 6,791,534 B2 * | 9/2004 | Tada et al. | 345/167 |
| 2001/0009414 A1 | 7/2001 | Badyal et al. | |

FOREIGN PATENT DOCUMENTS

| | | |
|---|---|---|
| DE | 4107085 A1 | 3/1991 |
| DE | 4316888 A1 | 5/1993 |
| EP | 0573018 A | 12/1993 |
| EP | 0987616 A | 3/2000 |
| GB | 2341439 A | 3/2000 |
| JP | 9146701 | 6/1997 |
| WO | WO 03065194 A | 8/2003 |
| WO | WO 03069460 A | 8/2003 |

* cited by examiner

PLAN VIEW

FRONT ELEVATION

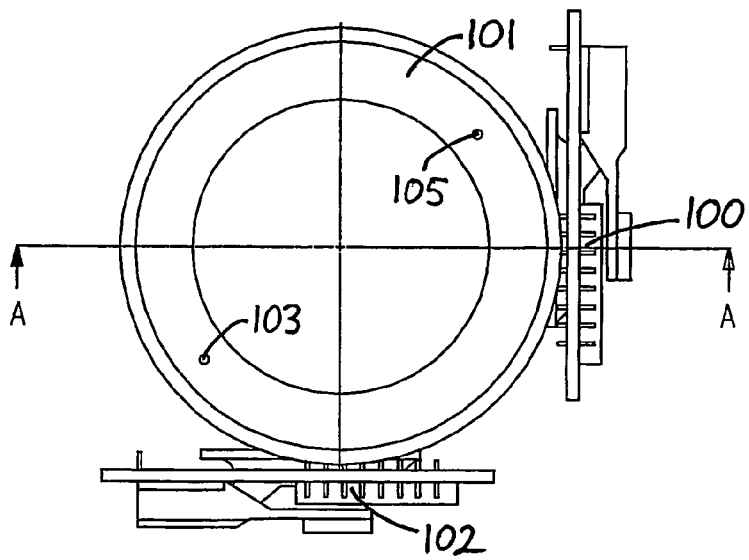
Figure 5a
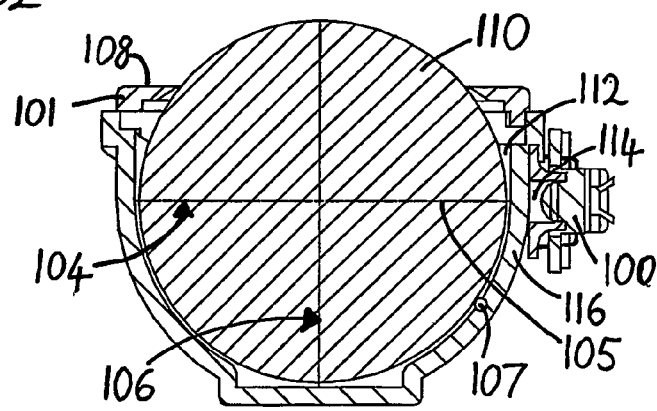
SECTION A-A
Figure 5b
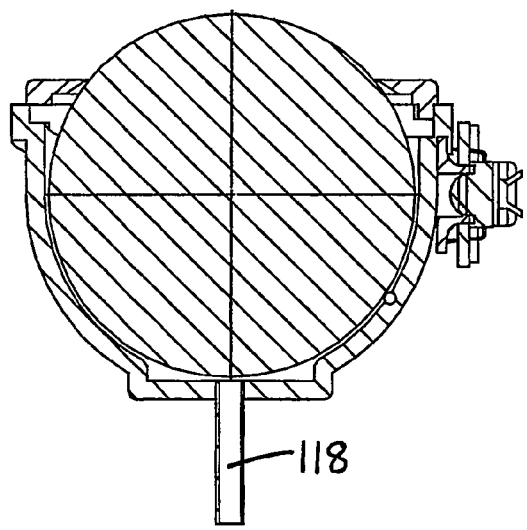
SECTION A-A
FITTED WITH DRAINAGE FACILITY
Figure 5c
FIGURE 5

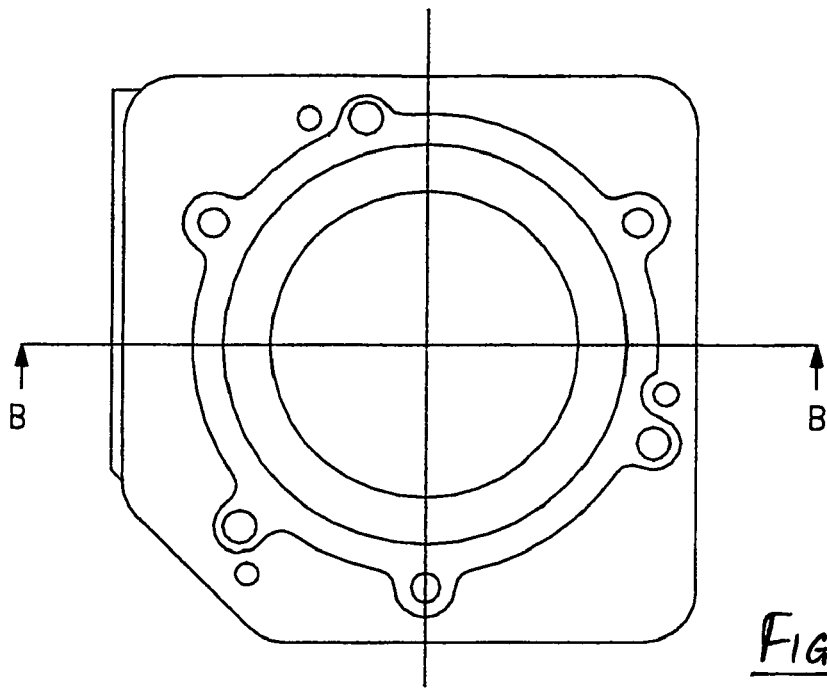
FIGURE 6a
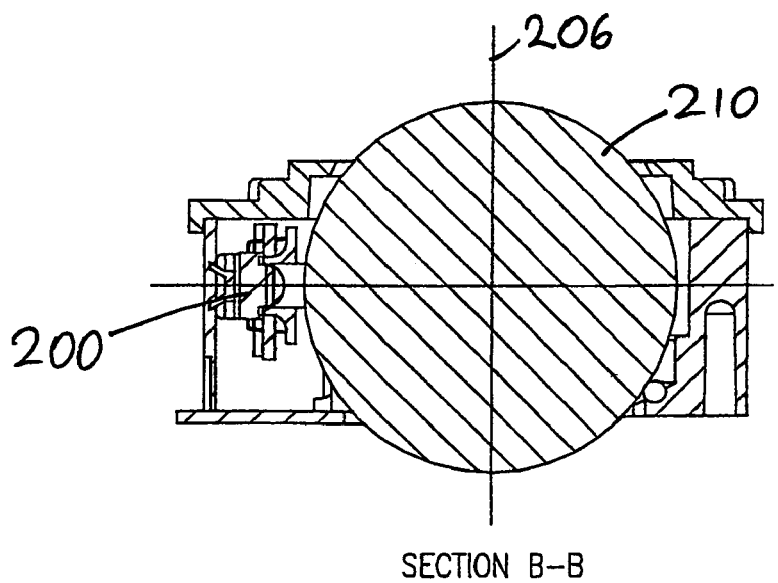
SECTION B-B
FIGURE 6b
FIGURE 6

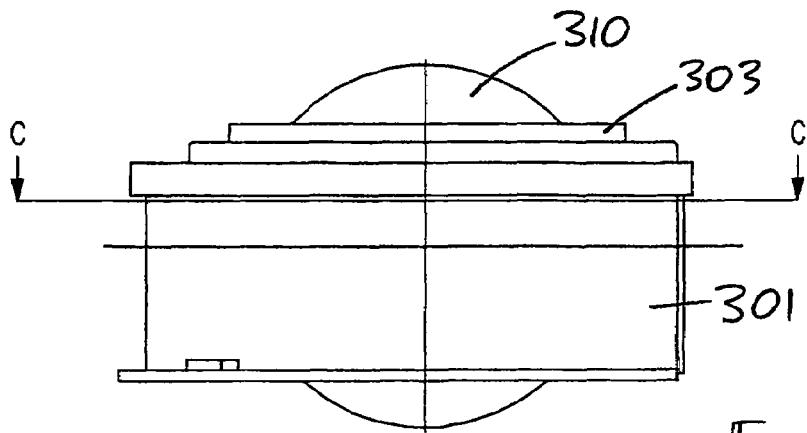
FIGURE 7a
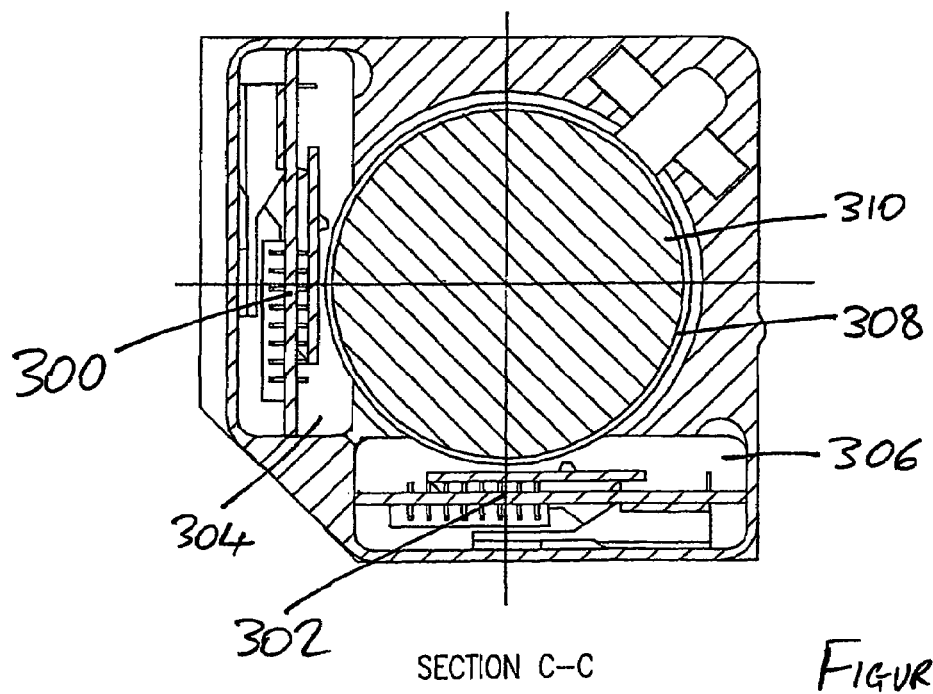
SECTION C-C
FIGURE 7b
FIGURE 7

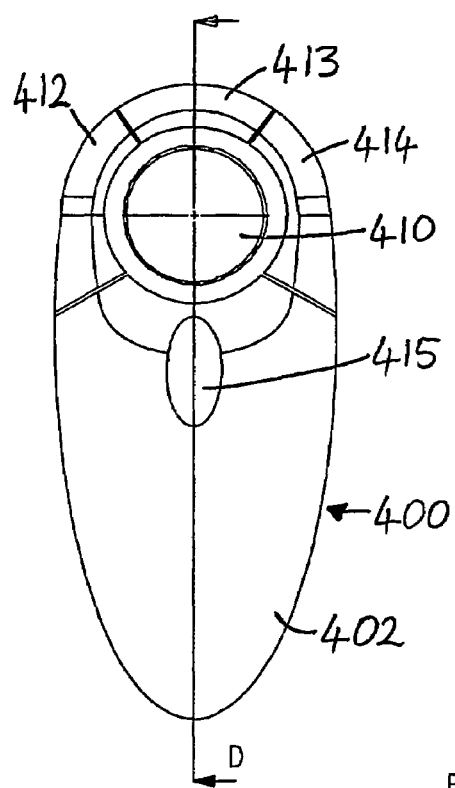
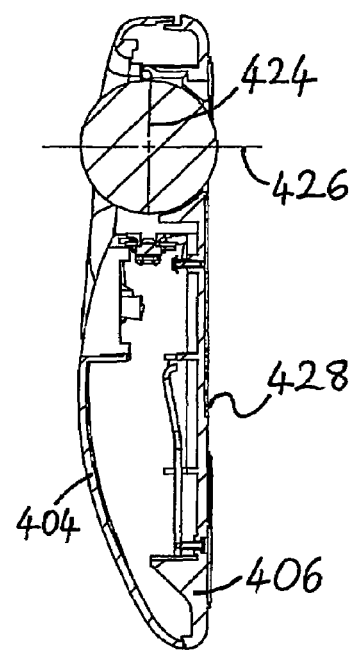
Figure 8a
SECTION D-D
Figure 8b
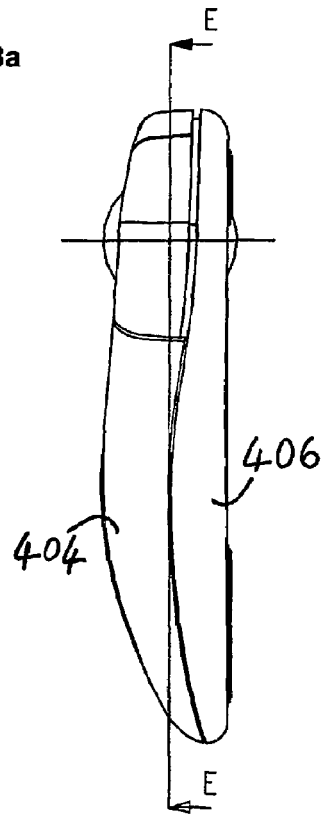
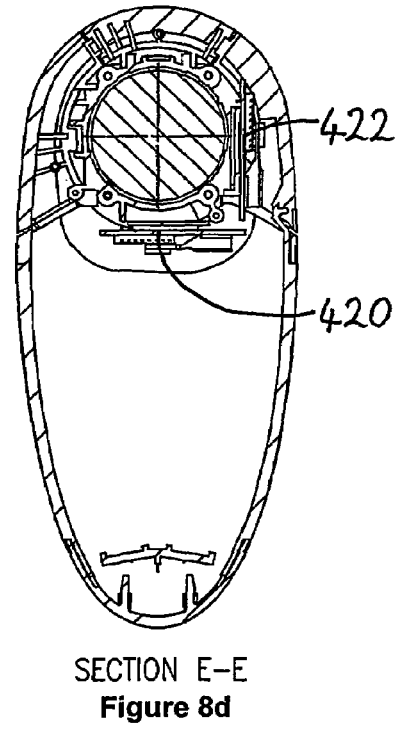
Figure 8c
SECTION E-E
Figure 8d
FIGURE 8

POINTING DEVICE

This invention relates to electronic pointing devices for use with a personal computer or other computer controlled electronic equipment. The term 'pointing device' should be interpreted broadly, to cover both mice and trackballs (also sometimes known as trackerballs). Such devices are typically used to control the movement of a cursor on a display screen.

Pointing devices or cursor control devices such as mice and trackballs are commonplace wherever there are computers or computer controlled equipment.

A pointing device is generally vulnerable to the ingress of liquid, which can cause potentially fatal damage to its internal circuitry and lead to failure of the device. In many cases, the environment in which the pointing device is situated greatly increases the risk of liquid ingress. Trackballs are often used in industrial locations such as factories, in which there may be an enhanced risk of liquid spillage. In some applications liquid ingress is virtually inevitable. For example, trackballs may be used to control ultrasound equipment in hospitals, where there is a high likelihood of ultrasound gel getting into the trackball mechanism. The term liquid as used herein should be taken to include gels, oils and other common fluids. Mice are also often prone to liquid ingress, which may result from accidents such as the spillage of a drink in an office. In outdoor applications, pointing devices are highly susceptible to the ingress of rainwater and other forms of precipitation.

If liquid is accidentally taken in by a pointing device, then this can also affect electrical or electronic apparatus connected or installed with it. In such cases the pointing device, and often the associated apparatus too, must immediately be switched off, either to replace the pointing device if it now no longer works, or to enable it to dry out. It is generally not possible to continue using the device or associated apparatus immediately after the ingress of liquid. This down-time, when the device is out of service, can be expensive in commercial environments and potentially life threatening if the device was being used to control hospital equipment.

In instances where the device has not been rendered wholly inoperable by the ingress of liquid, but has nevertheless taken in liquid, it is often neither possible nor recommended to wash it clean again, as the cleaning water may itself cause further damage to the electronic components. However, cleaning may be necessary, particularly if the fouling liquid is dirty. Traditional trackballs and mice require a relatively skilled person to clean them, which is costly in both time and money.

Ingress of solid matter (e.g. dirt and powder particles etc.) is also detrimental to the operation of pointing devices.

A further issue concerning optical trackballs in particular is that the overall height of the trackball assembly has traditionally been determined by the height of the ball, with the overall assembly being greater than the height of the ball. It is highly desirable to minimise the height of the trackball assembly, in order to enable it to be installed in equipment in which the available depth is limited.

It is a general object of the present invention to provide pointing devices which overcome or at least mitigate some or all of the above disadvantages associated with traditional pointing devices.

According to a first aspect of the invention there is provided an electronic pointing or cursor control device comprising a first chamber and a second chamber, wherein: the two chambers are adjoined and separated by a fluid-tight separating wall; the first chamber contains electronic components; the second chamber comprises an aperture; the second chamber contains a ball, the ball protruding through said aperture; the said separating wall comprises an optically permeable region; and the electronic components include optical detection means directed towards the optically permeable region and the ball, the detection means being operable in use to detect motion of the ball and to generate electronic signals representative of said motion.

Using two chambers separated by a fluid-tight wall provides the advantage that the electronic components are prevented from coming into contact with any liquid that enters the chamber containing the ball. The device is therefore not susceptible to damage from the effect of liquid coming into contact with the electronic components, and may continue to be used with liquid in the second chamber.

The two chambers being adjoined advantageously gives rise to a compact overall device that is relatively straightforward to manufacture.

The term "chamber" as used herein should be interpreted broadly, to encompass any volume or space in the pointing device on either side of the fluid-tight separating wall.

Importantly, there is no need for either chamber to be closed (i.e. bounded by walls on all sides), let alone for either chamber to be fluid-tight.

The aperture through which the ball protrudes from the second chamber may be a hole or opening in a wall of the second chamber. Alternatively the second chamber may be open-ended (i.e. the aperture is in effect the absence of a wall altogether), in which case the pointing device may be adapted to be butted against an existing panel (e.g. in a control console), and the existing panel may have a hole through which the ball may protrude.

The term "optically permeable" should be interpreted as having the property of allowing optical signals to pass from the ball to the detection means such that, in use, the detection means can correctly detect motion of the ball.

Preferably the first chamber is fluid-tight.

Preferably the ball is mounted in the second chamber such that the distance in the second chamber between the surface of said optically permeable region and the surface of the ball is sufficiently small such that any liquid between the ball and the optically permeable region of the separating wall is thinly dispersed and does not prevent optical transmission between the ball and the detection means.

Particularly preferably the distance in the second chamber between the surface of said optically permeable region and the surface of the ball is less than 1.5 mm.

Preferably the detection means comprise an optical lens, the focal depth of said lens being such as to ensure that, irrespective of the nature of any liquid between the ball and the optically permeable region of the separating wall, the detection means are sufficiently focused to enable the device to operate.

In preferred embodiments the separating wall may be made of a translucent plastics material, or a clear plastics material with a textured finish. This provides the advantage of preventing users from readily seeing the internal components of the first chamber. The optically permeable region of the separating wall may comprise a polished region of the said plastics material.

Preferably the second chamber further comprises a drainage outlet. This advantageously enables any liquid that has entered the second chamber to drain out.

The second chamber may further comprise a cleaning fluid inlet. This advantageously enables cleaning fluid to be supplied into the second chamber and then out through the drainage outlet, thereby keeping the second chamber and the ball clean without the intervention of a cleaning person. Accordingly, the second chamber may contain a cleaning liquid.

The optical detection means may be mounted in a position substantially on a diametric line though the ball normal to the mounting plane of the device. The term "mounting plane" is used herein to refer to the plane against which or parallel to which the device is mounted in use. The mounting plane may be, for example, the plane of a control console in which the device is installed.

However, in preferred embodiments, the optical detection means are mounted at an angular position around the circumference of the ball such that a radial line from the ball to the detection means forms a non-zero angle with a diametric line though the ball normal to the mounting plane of the device. Mounting the detection means in such an angular position results in the height of the device being reduced from what it would have been were the detection means mounted on the diametric line through the ball. Thus, the detection means may advantageously be positioned so as to be within the profile of the ball when viewed from the side, such that the overall height of the device is no greater than that of the ball.

In some preferred embodiments, the optical detection means are mounted at an angular position around the circumference of the ball such that a radial line from the ball to the detection means forms a non-zero angle of between 0° and 20° with a diametric line though the ball normal to the mounting plane of the device. It has been found that, within this range of angles, the user's brain can compensate for any discrepancy between ball movement and the resulting movement of the cursor, without the need for the output from the detection means to be trigonometrically processed.

In other preferred embodiments, the optical detection means are mounted at an angular position around the circumference of the ball such that a radial line from the ball to the detection means forms an angle of between 20° and 50° with a diametric line though the ball normal to the mounting plane of the device. With this range of angles, preferably the device further comprises processing means configured to apply vector transformations to the signals generated by the detection means in order to compensate for the angular position at which the detection means are mounted.

In yet further preferred embodiments, the optical detection means are mounted at an angular position around the circumference of the ball such that a radial line from the ball to the detection means forms an angle of substantially 90° with a diametric line though the ball normal to the mounting plane of the device. Preferably the optical detection means comprise two optical detectors mounted in mutually orthogonal positions with respect to said diametric line. The use of two optical detectors arranged in orthogonal positions (effectively on the equator of the ball) advantageously enables one detector to be assigned to ball movement in one direction (e.g. the X-axis), and the other to movement in the orthogonal direction (e.g. the Y-axis). Processing of the signals from the two orthogonal detectors is straightforward, and trigonometric processing is not required.

Preferably the device is a trackball. Alternatively it may be a mouse.

According to a second aspect of the invention there is provided an electronic pointing or cursor control device comprising a ball and optical detection means responsive to movement of the ball, the optical detection means being operable in use to detect motion of the ball and to generate electronic signals representative of said motion, wherein the detection means are mounted at an angular position around the circumference of the ball such that a radial line from the ball to the detection means forms a non-zero angle with a diametric line though the ball normal to the mounting plane of the device.

As mentioned above, mounting the detection means at a non-zero angle results in the height of the device being reduced from what it would have been were the detection means mounted in line with the diametric line through the ball. Thus, the detection means may advantageously be positioned so as to be within the profile of the ball when viewed from the side, such that the overall height of the device is no greater than that of the ball.

Preferably the detection means are mounted at an angle of substantially 90° from a diametric line though the ball normal to the mounting plane of the device, said angle being measured from the centre of the ball. Particularly preferably the detection means comprise two optical detectors mounted in mutually orthogonal positions with respect to said diametric line. The use of two optical detectors arranged in orthogonal positions (effectively on the equator of the ball) advantageously enables one detector to be assigned to ball movement in one direction (e.g. the x-axis), and the other to movement in the orthogonal direction (e.g. the y-axis). Processing of the signals from the two orthogonal detectors is straightforward, and trigonometric processing is not required.

Alternatively, preferably the detection means are mounted at a non-zero angle of between 0° and 20° from a diametric line though the ball normal to the mounting plane of the device, said angle being measured from the centre of the ball.

As a further alternative, preferably the detection means are mounted at an angle of between 20° and 50° from a diametric line though the ball normal to the mounting plane of the device, said angle being measured from the centre of the ball. In this case, the device may further comprise processing means configured to apply vector transformations to the signals generated by the detection means in order to compensate for the angle at which the detection means are mounted.

Preferably the device further comprises a first chamber and a second chamber, and: the two chambers are adjoined and separated by a fluid-tight separating wall; the first chamber contains electronic components; the second chamber comprises an aperture; the second chamber contains the ball, the ball protruding through said aperture; the said separating wall comprises an optically permeable region; and the electronic components include optical detection means directed towards the optically permeable region and the ball. The advantages of using two chambers separated by a fluid-tight wall have been described above.

Preferably the first chamber is fluid-tight.

Preferably the distance in the second chamber between the surface of said optically permeable region and the surface of the ball is sufficiently small such that any liquid between the ball and the optically permeable region of the separating wall is thinly dispersed and does not prevent optical transmission between the ball and the detection means. Particularly preferably the distance in the second chamber between the surface of said optically permeable region and the surface of the ball is less than 1.5 mm.

Preferably the detection means comprise an optical lens, the focal depth of said lens being such as to ensure that, irrespective of the nature of any liquid between the ball and the optically permeable region of the separating wall, the detection means are sufficiently focused to enable the device to operate.

Preferably the separating wall is made of a translucent plastics material. Particularly preferably the optically permeable region of the separating wall comprises a polished region of the said plastics material.

Preferably the second chamber further comprises a drainage outlet.

Preferably the second chamber further comprises a cleaning fluid inlet.

Preferably the second chamber contains cleaning liquid.

Preferably the device is a trackball. Alternatively it may be a mouse.

Embodiments of the invention will now be described, by way of example, and with reference to the drawings in which:

FIG. 5 illustrates a plan view (FIG. 5a) and sectional views (FIGS. 5b and 5c) of embodiments of a trackball in accordance with the first and second aspects of the invention, in which two optical sensors are equatorially mounted around the ball, and in which the sensors are separated from the ball chamber by a fluid-tight wall;

FIG. 6 illustrates a plan view (FIG. 6a) and a sectional view (FIG. 6b) of an embodiment of a trackball in accordance with the second aspect of the invention;

FIG. 7 illustrates a plan view (FIG. 7a) and a sectional view (FIG. 7b) of another embodiment of a trackball in accordance with the first and second aspects of the invention; and FIG. 8 illustrates a plan view (FIG. 8a), a sectional side view (FIG. 8b), a side view (FIG. 8c) and a sectional plan view (FIG. 8d) of an embodiment of a mouse in accordance with the second aspect of the invention.

DUAL-CHAMBER POINTING DEVICES

Figure 1:
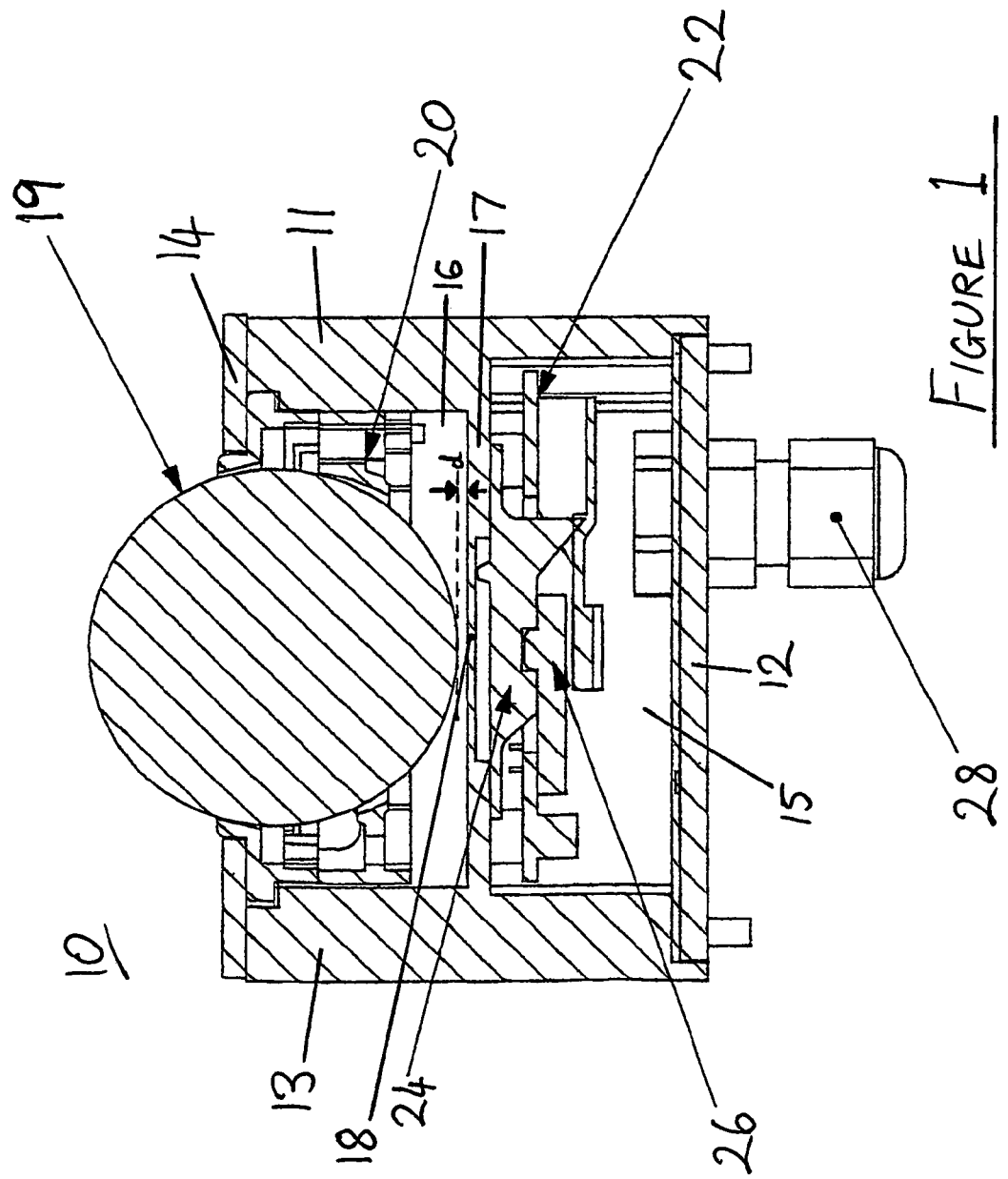
FIG. 1 illustrates a cross section of a trackball in accordance with the first aspect of the invention, incorporating two separate chambers, one of which is fluid-tight and contains the electronic components, and the other of which contains the ball.

FIG. 1 illustrates an optical trackball assembly 10 comprising two chambers 15, 16 separated by a fluid-tight separating wall 17 common to both chambers. The first chamber 15 is formed by the side walls 11, 13 of the device, the base panel 12 and the separating wall 17. The side walls 11, 13 and the separating wall 17 may be made from a single piece of material (e.g. a plastics moulding) which advantageously enables manufacturing costs to be minimised and the device to be made compact.

The first chamber 15 contains the electronic components the device requires for operation, principally a printed circuit board 22 and an optical sensor 26, details of which will be given later. The first chamber 15 is fluid-tight, thereby preventing liquid from the environment coming into contact with the electronic components 22, 26. A cable gland 28 is provided to enable a cable (not shown) to be connected to the circuit board 22 whilst still maintaining a sealed chamber. When in use, this cable is connected to another piece of equipment such as a personal computer or a piece of computer controlled machinery. The cable gland 28 may be located on a side wall (e.g. wall 11) of the first chamber, as an alternative to being underneath the device.

The second chamber 16 is open to the environment, and contains the ball 19 that, in use, is manipulated by a user, for example to control a cursor. The second chamber is formed by the side walls 11, 13, the separating wall 17, and the top panel 14. A chassis 20 is located within the second chamber 16, the chassis being adapted to support the ball 19. The top panel 14 may be removable, to enable the ball to be removed if necessary.

Since the first chamber 15 is separated from the second chamber 16 by the fluid-tight separating wall 17, any liquid that enters the second chamber from the environment cannot reach the electronic components. Indeed, a key aspect of this device is that there are no water-sensitive electronic components in the second chamber, and no electrical connections run between the chambers.

The fluid-tight separating wall 17 may also be used to separate explosive or harmful gases from the electronic components. This is particularly useful in petrol stations, refineries, gas plants and other instances in which there is a danger of explosion or fire resulting from the ingress of flammable gases into electrical cabinets. Thus, flammable gases are safely contained in the second chamber 16, and do not reach the electronic components in the first chamber 15.

In use, movement of the ball is detected by a solid state optical sensor 26 directed towards the ball 19, and an LED (not illustrated) is used to provide the required incident illumination on the ball. The LED is mounted in the first chamber along with all the other electronic components. To enable the LED to illuminate the under-surface of the ball, and to enable the sensor 26 to receive optical signals from the ball, an optically permeable region 18 of sufficient size is provided in the separating wall 17. This optically permeable region 18 may be a region of transparent or translucent plastics material, or another material with the requisite properties as would be selected by a materials expert.

An optical lens 24 is positioned between the sensor 26 and the optically permeable region 18 of the separating wall 17. (In an alternative embodiment, the lens may be incorporated in, or integral with, the separating wall 17.) The optical lens 24 is adapted and arranged such that the focal depth of the sensor 26 is sufficient to enable it to detect correctly movement of the ball, even if there is liquid in the second chamber.

The ball 19 is a conventional ball as used in existing optical mice and trackballs. The surface or coated subsurface of the ball may incorporate a speckled pattern or other markings to enable the optical sensor 26 to detect the ball's motion.

Known optical mouse (or trackball) sensing technology may be employed for all the electronic components provided to detect optically the motion of the ball. Particularly suitable for this purpose is the Agilent Technologies HDNK-2000 solid state optical mouse sensor kit. Details of the components of this kit are given in Appendix A. Alternatively the Agilent (RTM) ADNS-2051 sensor may be used in this application. Future derivatives of the ADNS-2051 sensor may also be used with minor changes to the electronic components.

Importantly, there is only a small gap in the second chamber 16 between the surface of the optically permeable region 18 of the separating wall 17 and the bottom of the ball 19, as indicated by d in FIG. 1. This gap is preferably less than 1.5 mm, and is sufficiently small such that any liquid between the ball 19 and the optically permeable region 18 of the separating wall 17 is thinly dispersed and does not prevent optical transmission between the ball and the detection means.

The overall geometry of the device is such as to enable it to be retro-fitted in existing units, to replace previous trackballs.

Figure 2:
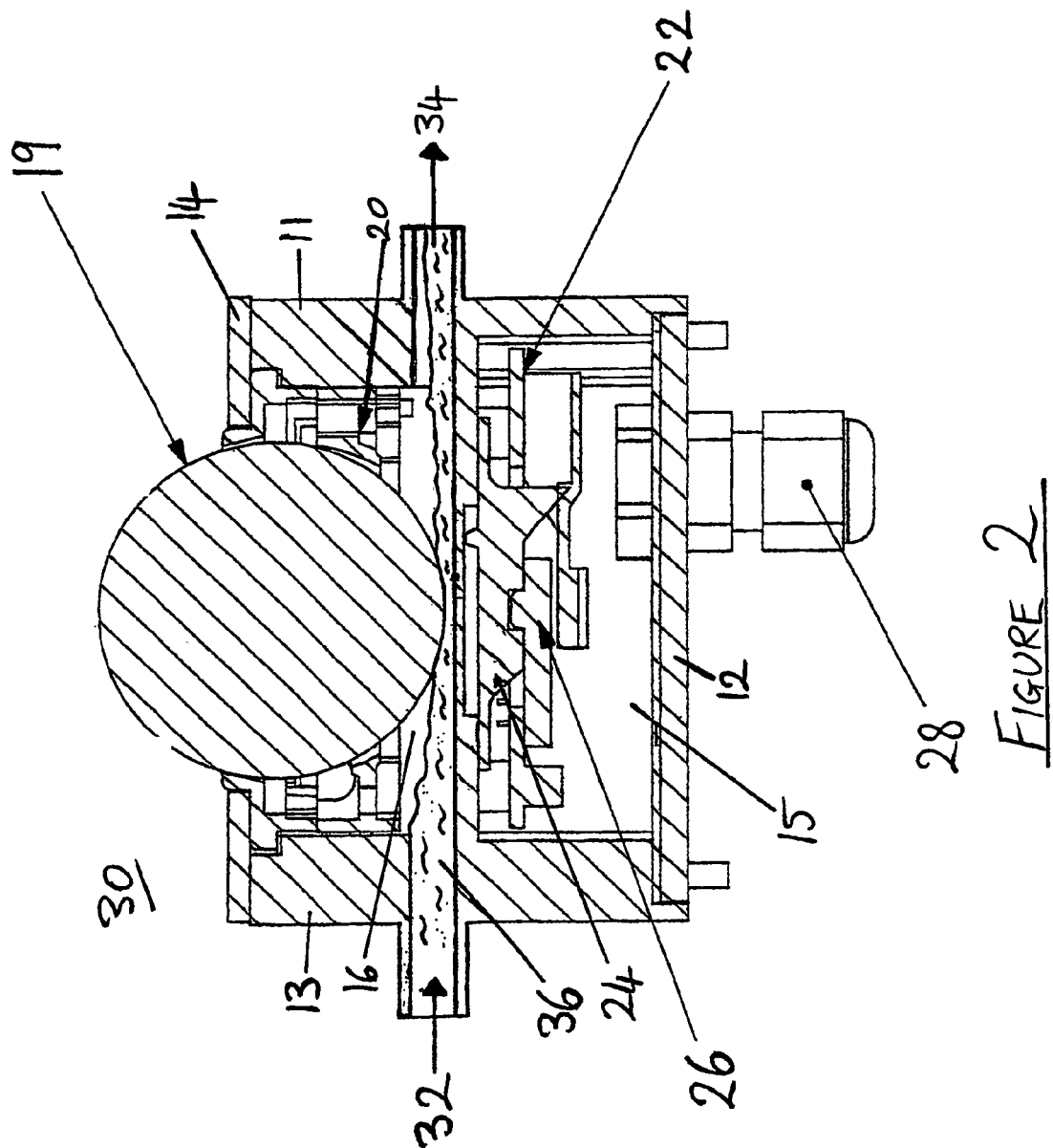
FIG. 2 illustrates a cross section of another trackball in accordance with the first aspect of the invention, wherein the chamber containing the ball has a drainage outlet, a cleaning fluid inlet, and contains some liquid therein.

FIG. 2 illustrates schematically a trackball assembly 30 incorporating a drainage outlet 34 and an optional cleaning fluid inlet 32. The drainage outlet 34, which facilitates drainage of any liquid from the second chamber 16, may be provided without the cleaning fluid inlet 32. However, advantageously, the cleaning fluid inlet 32 enables a supply of cleaning fluid 36 to be delivered through the second chamber 16, thereby keeping the ball clean during use. As in the previous figure, the first chamber 15 contains all the necessary electronic components for sensing movement of the ball.

Figure 3:
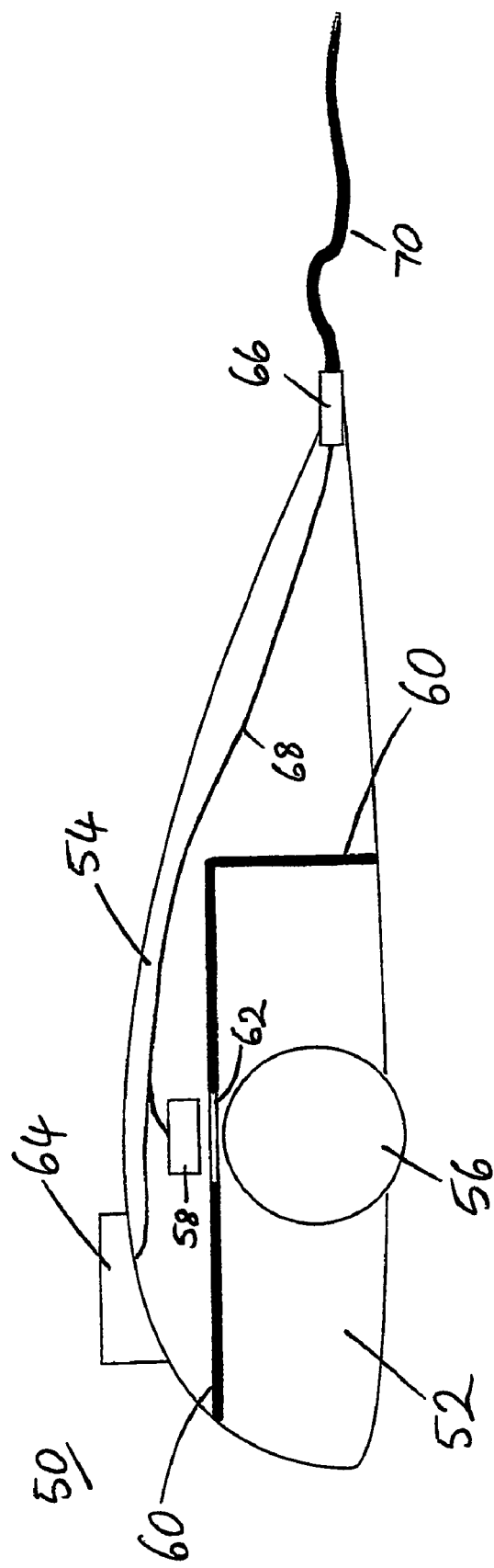
FIG. 3 illustrates in cross section a mouse, also in accordance with the first aspect of the present invention.

FIG. 3 illustrates an optical mouse 50 also embodying aspects of the invention, namely two chambers 52, 54 separated by a fluid-tight separating wall 60. The first chamber 54 is fluid-tight and includes the electronic components including the optical sensor 58 and the switch(es) for the mouse button(s) 64. The second chamber 52 houses the ball 56 and is open to the environment. The separating wall 60 separating the first and second chambers includes an optically permeable region 62 enabling the optical sensor apparatus to detect motion of the ball and to generate signals representative of that motion. Also shown in FIG. 3 are internal electrical cables 68 which carry signals from the mouse button(s) 64 and the optical sensor 58, a cable gland 66, and an external cable 70 for connection to a computer.

Reduced Height Pointing Devices

Figure 4:
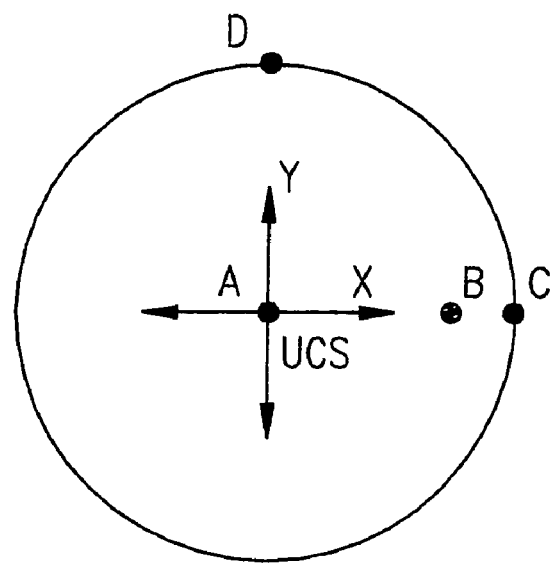
FIG. 4 illustrates the geometry of a ball of a pointing device, indicating the relative positions of the device's mounting plane and possible positions of optical sensors.
Figure 4:
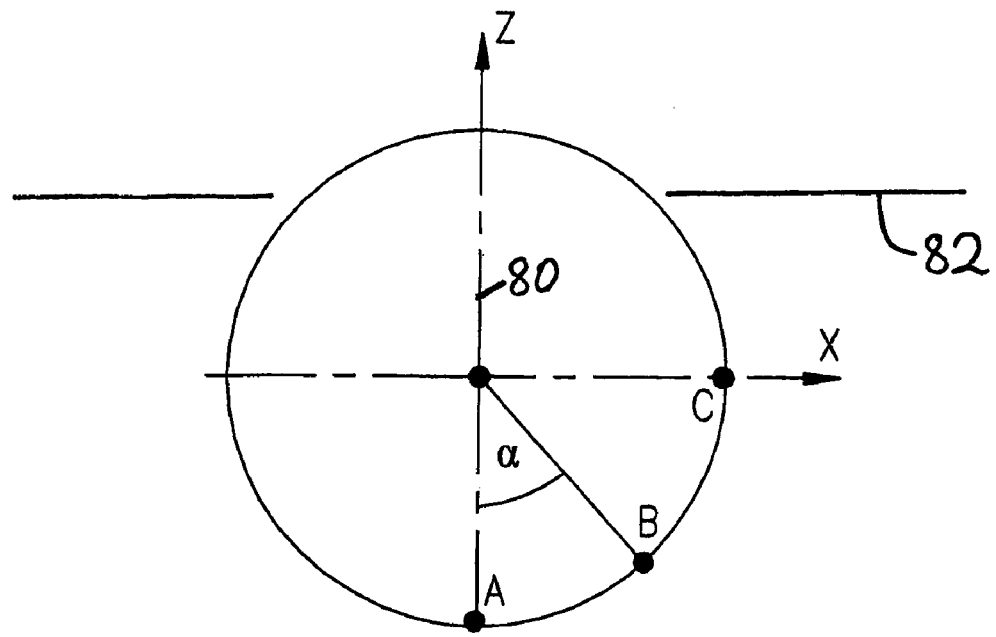

The overall height of any of the above dual-chamber devices may be reduced by moving the optical sensor around the circumference of the ball to an angular position such that a radial line from the ball to the sensor forms a non-zero angle with a diametric line though the ball normal to the mounting plane of the device. This is illustrated in FIG. 4, in which the non-zero angle is indicated by $\alpha$, the angular position of the sensor is B, the said diametric line is 80 and the mounting plane of the device is 82.

It will be appreciated that an optical sensor may be positioned in such an angular position to provide the benefits of height reduction even if the pointing device assembly is not formed using two chambers as described above. Indeed, the principle that will now be described for constructing reduced height (or "slim-line") pointing devices is equally applicable to conventional non-fluid-tight pointing devices as well as those described above.

In the dual-chamber pointing devices described above, the optical sensor is mounted in a position on a diametric line though the ball normal to the mounting plane of the device. This mounting position is indicated as position A in FIG. 4, beneath the ball on the vertical axis (Z). In use, an optical sensor in this position has the advantage that X and Y rotation in the User Coordinate System (UCS) maps directly to X and Y movement in the Electrical Coordinate system (ECS). That is to say, movement of the ball is proportional to movement of the cursor on screen, and no distortion of the cursor movement is apparent on screen. However, the disadvantage of this arrangement is that the overall depth of the unit is increased by having the sensor beneath the ball.

To reduce the overall height of the trackball assembly, it is desirable to position the optical sensor at a position such as B, so that the profile of the assembly (when viewed from the side) does not extend below the lowest point of the ball. Thus, the overall height of the device is no greater than the height of the ball alone. However, mounting the sensor in a position such as B results in an unequal mapping between the UCS and ECS, and accordingly trigonometric compensation may be required to provide direct mapping between ball movement and X/Y cursor movement on the screen.

In practice, whether trigonometric compensation is required or not depends on the size of the angle $\alpha$ (FIG. 4). There are four general cases.

Case 1: $\alpha=0°$: No distortion of the cursor movement on screen, so no trigonometric compensation required.

Case 2: $0°<\alpha<20°$: The error without compensation as seen on the screen is at a level which may be undetectable by the human user. Any distortion of the cursor movement on screen is intuitively compensated by the user's brain and their hand-eye coordination.

Case 3: $20°<\alpha<50°$: The error without compensation as seen on the screen is at a level which is detectable by the human user and which should be compensated trigonometrically. This compensation is performed by a microprocessor, performing vector transformations on the output signals from the sensors.

It should be appreciated that the angles of 20° and 50° mentioned above are only approximate values.

It should also be noted that the above approximations hold true when the ball is moved at a reasonable speed (greater than or equal to approximately one rotation per second). For very slow ball motion it becomes impossible to perform the vector transformations since the preferred protocol employed uses only integer values to denote the ball movement.

As $\alpha$ approaches 90°, trigonometric solution of the error between the UCS and ECS becomes increasingly impractical with increasing a. However, in order to obtain a trackball unit of minimal height (such that nothing extends below the lowest part of the ball), the optimal physical location of the optical sensor occurs at $\alpha=90°$. Here, the physical depth profile of the device is equal to the diameter of the ball (typically 50 mm).

Before discussing further the special case of $\alpha=90°$, it is useful to consider first the response characteristics of an optical sensor to different directions of rotation of a ball. An optical sensor is not responsive to the rotation of a ball about an axis collinear with an imaginary radial line extended from the centre of the ball to the sensor. For example, if the sensor is placed directly beneath the ball (e.g. in position A), it will not detect any rotation of the ball about the vertical axis Z. This is not of concern when the sensor is directly beneath the ball, as this type of rotation would not be used to control a cursor, and the ball would ordinarily be rotated about a horizontal axis (e.g. X or Y) instead. The corresponding direction of motion in the X/Y plane would be detected by the sensor in position A beneath the ball, this being possible because the axis of rotation is not collinear with the above-mentioned radial line from the ball to the sensor.

When $\alpha=90°$, it is therefore necessary to use two optic sensors positioned mutually orthogonally with respect to the vertical Z axis, for example at points C and D in FIG. 4. As discussed above, a single sensor positioned in one of these positions would not be responsive to certain conditions of ball rotation, and it would not be possible to apply mathematical compensation to a single sensor to achieve an equivalent effect. For example, the sensor in position C would be unresponsive to rotation of the ball in the Y direction, and would only respond to rotation in the X direction. Likewise, the sensor in position D would be unresponsive to rotation of the ball in the X direction, and would only respond to rotation in the Y direction. Hence, by using two sensors in mutually orthogonal positions, both X and Y rotation can be detected. Each sensor provides a separate X or Y component of the ECS, which may mapped directly to the UCS without the need for vector transformations or equivalent signal processing.

FIGS. 5 to 8 illustrate examples of pointing device assemblies in which two sensors are used, substantially in positions equivalent to C and D in FIG. 4.

FIGS. 5a, 5b and 5c illustrate a first example of a trackball assembly having two optical sensors 100, 102 positioned orthogonally about the equator 104 of the ball 110. That is to say, the sensors are positioned around the circumference of the ball such that a radial line 105 from the centre of the ball to each sensor (e.g. 100) subtends the vertical diametric line 106 (which is normal to the device's mounting plane 108) at an angle of 90°.

The ball 110 (which is, for example, 50 mm in diameter) is retained in the assembly by a removable top plate 101, secured to the assembly below by screws 103, 105 or equivalent fixing means. A top plate to retain the ball is not necessary, however, and some embodiments may be designed such that the ball may be lifted straight out of the assembly, e.g. to facilitate cleaning. A bearing 107 is provided to assist the free rotation of the ball 110.

The ball 110 is in a first chamber 112 in which fluid ingress may in principle occur. To prevent any fluid in the first chamber from reaching the electronic components such as the optical sensors 100, 102, each sensor (e.g. 100) is effectively in a separate chamber 114 to the chamber 112 containing the ball, with the chambers 112 and 114 being separated by a fluid-tight wall 116 having an optically permeable region to permit transmission of the optical signal.

To enable fluid to be drained from the first chamber 112, a drainage outlet 118 may be incorporated. A cleaning fluid inlet may also be provided, although this is not illustrated.

For applications in which fluid ingress is not a problem, but in which a slim-line pointing device is desired, a trackball assembly may be constructed using two sensors mounted orthogonally about the equator of the ball, but without using two chambers. This is illustrated in FIGS. 6a and 6b. In FIG. 6b, one sensor 200 is shown, acting directly on the ball 210. A second sensor (not shown) is mounted on the same equatorial level as the first sensor 200, but in an orthogonal position with respect to the first sensor and the vertical diametric line 206.

FIGS. 7a and 7b illustrate a variant of the device illustrated in FIG. 5. In this case, the height of the housing 301 is less than that of the ball 310, so that the overall height of the assembly is no greater than that of the ball 310. The ball 310 is retained in the housing 301 by a top plate 303. To achieve the slim-line profile shown in FIG. 7a, two sensors 300, 302 are equatorially mounted about the ball 310, in a similar manner to FIG. 5. Each sensor 300, 302 is in its own chamber 304, 306 respectively, to prevent fluid ingress around the ball from reaching the electrical components.

Finally, FIGS. 8a, 8b, 8c and 8d illustrate views of a mouse 400 in which two optical sensors 420, 422 are equatorially mounted around the ball 410 in order to achieve a slim-line assembly. With reference to FIG. 8b, the equatorial plane of the ball is indicated by the line 424, which is normal to the diametric line 426. As with the trackball embodiments described above, this diametric line may be considered to be normal a mounting plane 428, which in this case is the plane on which the mouse operates when in use.

The mouse assembly also includes a housing 402 made up of a top casing 404 and a bottom casing 406, and control buttons 412, 413, 414 and 415. FIGS. 8b and 8c show that the depth of the housing is less than the height of the ball (which is itself only 25 mm in diameter), and this results in the ball protruding both above and below the housing. Because of this, this mouse may also be used as a hand-held trackball device.

In the embodiment shown in FIG. 8, the optical sensors 420, 422 are not separated from the ball chamber by a fluid-tight barrier wall, although it will be appreciated that such a barrier could readily be incorporated if required.

Appendix A

Agilent Technologies HDNK-2000 Solid State Optical Mouse Sensor Kit

Kit Components
   See table below.

Sensor
   The sensor technical information is contained in the HDNS-2000 Data Sheet and Application Note 1179.

Lens
   The lens information is contained in the HDNS-2100 Data Sheet and Application Note 1179.

LED Assembly Clip
   The assembly information is contained in the HDNS-2200 Technical Data Sheet and the HDNS-2000 Application Note 1179.

LED
   Information on the LED is contained in the HLMP-ED80 Data Sheet and Application Note 1179.

Base Plate Feature IGES File
   The IGES file provides recommended base plate moulding features to ensure optical alignment.

| Part Number | Description | Name |
| --- | --- | --- |
| HDNS-2000 | Solid state optical mouse sensor | Sensor |
| HDNS-2100 | Lens plate | Lens |
| HDNS-2200 | LED Assembly Clip | LED Clip |
| HLMP-ED80 | 639 nm T 1¾ (5 mm) diameter LED | LED |
| Documentation | HDNS-2000 Data Sheet | — |
| Documentation | HDNS-2100 Data Sheet | — |
| Documentation | HDNS-2200 Data Sheet | — |
| Documentation | LED Data Sheet | — |
| Documentation | Application Note 1179 | — |
| Floppy Diskette | Base Plate Feature IGES File | — |

The address of Agilent Technologies, Inc. is 395 Page Mill Road, Palo Alto, Calif. 94303, United States of America.

The invention claimed is:

1. An electronic pointing or cursor control device comprising a first chamber and a second chamber, wherein:
   the first chamber is fluid tight;
   the two chambers are adjoined and separated by a fluid-tight separating wall;
   the first chamber contains electronic components;
   the second chamber comprises an aperture;
   the second chamber contains a ball, the ball protruding through said aperture;
   the said separating wall comprises an optically permeable region; and
   the electronic components include an optical detector directed towards the optically permeable region and the ball, the optical detector being operable in use to detect motion of the ball and to generate electronic signals representative of said motion, wherein the distance in the second chamber between the surface of said optically permeable region and the surface of the ball is sufficiently small such that any liquid between the ball and the optically permeable region of the separating wall is thinly dispersed and does not prevent optical transmission between the ball and the optical detector.

2. A device as claimed in claim 1, wherein the distance in the second chamber between the surface of said optically permeable region and the surface of the ball is less than 1.5 mm.

3. A device as claimed in claim 1, wherein the optical detector comprises an optical lens, the focal depth of said lens being such as to ensure that, irrespective of the nature of any liquid between the ball and the optically permeable region of the separating wall, the optical detector is sufficiently focused to enable the device to operate.

4. A device as claimed in claim 1, wherein the separating wall is made of a translucent plastics material.

5. A device as claimed in claim 4, wherein the optically permeable region of the separating wall comprises a polished region of the said plastics material.

6. A device as claimed in claim 1, wherein the second chamber further comprises a drainage outlet.

7. An electronic pointing or cursor control device comprising a first chamber and a second chamber, wherein:
- the two chambers are adjoined and separated by a fluid-tight separating wall;
- the first chamber contains electronic components;
- the second chamber comprises an aperture;
- the second chamber contains a ball, the ball protruding through said aperture;
- the said separating wall comprises an optically permeable region;
- the electronic components include an optical detector directed towards the optically permeable region and the ball, the optical detector being operable in use to detect motion of the ball and to generate electronic signals representative of said motion;
- the second chamber further comprises a drainage outlet; and
- the second chamber further comprises a cleaning fluid inlet.

8. A device as claimed in claim 1, wherein the second chamber contains cleaning liquid.

9. A device as claimed in claim 1, wherein the optical detector is mounted in a position substantially on a diametric line through the ball normal to the mounting plane of the device.

10. A device as claimed in claim 1, wherein the optical detector is mounted at an angular position around the circumference of the ball such that a radial line from the ball to the optical detector forms a non-zero angle with a diametric line through the ball normal to the mounting plane of the device.

11. A device as claimed in claim 10, wherein the optical detector is mounted at an angular position around the circumference of the ball such that a radial line from the ball to he optical detector forms a non-zero angle of between 0° and 20° with a diametric line through the ball normal to the mounting plane of the device.

12. A device as claimed in claim 10, wherein the optical detector is mounted at an angular position around the circumference of the ball such that a radial line from the ball to the optical detector forms a non-zero angle of between 20° and 50° with a diametric line through the ball normal to the mounting plane of the device.

13. A device as claimed in claim 12, further comprising a processor configured to apply vector transformations to the signals generated by the optical detector in order to compensate for the angular position at which the optical detector is mounted.

14. A device as claimed in claim 10, wherein the optical detector is mounted at an angular position around the circumference of the ball such that a radial line from the ball to the optical detector forms an angle of substantially 90° with a diametric line through the ball normal to the mounting plane of the device.

15. A device as claimed in claim 14, wherein the optical detector is one of two such optical detectors mounted in mutually orthogonal positions with respect to said diametric line.

16. A device as claimed in claim 1 being a trackball.

17. A device as claimed in claim 1 being a mouse.

* * * * *